US010625157B2

(12) United States Patent
Yamamoto et al.

(10) Patent No.: US 10,625,157 B2
(45) Date of Patent: Apr. 21, 2020

(54) DISPLAY CONTROL PROGRAM, DISPLAY CONTROL APPARATUS, DISPLAY CONTROL METHOD, AND RECORDING MEDIUM

(71) Applicant: SONY INTERACTIVE ENTERTAINMENT INC., Tokyo (JP)

(72) Inventors: Masami Yamamoto, Tokyo (JP); Teruyuki Toriyama, Tokyo (JP); Haruyuki Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/697,906

(22) Filed: Sep. 7, 2017

(65) Prior Publication Data

US 2018/0065037 A1    Mar. 8, 2018

(30) Foreign Application Priority Data

Sep. 8, 2016    (JP) ................. 2016-175259

(51) Int. Cl.
*A63F 13/428*    (2014.01)
*A63F 13/5255*    (2014.01)
(Continued)

(52) U.S. Cl.
CPC ............ *A63F 13/428* (2014.09); *A63F 13/21* (2014.09); *A63F 13/26* (2014.09);
(Continued)

(58) Field of Classification Search
None
See application file for complete search history.

(56) References Cited

U.S. PATENT DOCUMENTS 6,139,434 A * 10/2000 Miyamoto ............ A63F 13/06
463/32
9,928,650 B2   3/2018 Inomata
(Continued)

FOREIGN PATENT DOCUMENTS

JP    1069367 A    3/1998
JP    5869177 B1   2/2016
(Continued)

OTHER PUBLICATIONS

Berserk Games—Tabletop simulator, Nov. 6, 2014, YouTube video—"Tabletop Simulator Tutorial Series Part 1—Controls", https://www.youtube.com/watch?v=cNw52Xh4Rwo (Year: 2014).*
(Continued)

*Primary Examiner* — Damon J Pierce
(74) *Attorney, Agent, or Firm* — Matthew B. Dernier, Esq.

(57) ABSTRACT

There is provided a display control program for a computer. The display control program includes: by an image generation block, setting a viewpoint position and a sightline direction in accordance with one of a position and an attitude of a head mounted display worn on the head of a user and rendering an object arranged in a virtual three-dimensional space so as to generate an image to be displayed on the head mounted display; and by a rotation control block, upon acquiring an instruction for rotating a game field arranged in the virtual three-dimensional space, rotating the game field around an axis perpendicular to the game field.

10 Claims, 9 Drawing Sheets

(51) Int. Cl.
*A63F 13/26* (2014.01)
*A63F 13/21* (2014.01)
*A63F 13/537* (2014.01)

(52) U.S. Cl.
CPC ........ *A63F 13/5255* (2014.09); *A63F 13/537* (2014.09); *A63F 2300/6676* (2013.01); *A63F 2300/8082* (2013.01)

(56) References Cited

U.S. PATENT DOCUMENTS

| | | | |
|---|---|---|---|
| 2006/0105838 A1* | 5/2006 | Mullen | A63F 13/25 463/31 |
| 2011/0169928 A1* | 7/2011 | Gassel | H04N 13/044 348/53 |
| 2015/0346813 A1* | 12/2015 | Vargas | G06F 3/012 345/8 |
| 2015/0352437 A1* | 12/2015 | Koseki | A63F 13/212 463/31 |
| 2017/0076497 A1 | 3/2017 | Inomata | |
| 2018/0227470 A1* | 8/2018 | Ronngren | G06F 1/163 |

FOREIGN PATENT DOCUMENTS

| | | |
|---|---|---|
| JP | 5981006 B1 | 8/2016 |
| JP | 2017224003 A | 12/2017 |

OTHER PUBLICATIONS

Notification of Reasons for Refusal for corresponding JP Application No. 2016-175259, 13 pages, dated Aug. 14, 2018.
Notification of Reasons for Refusal for corresponding JP Application No. 2018-223828, 9 pages, dated Nov. 12, 2019.
Steam early access of tabletop game system "Tabletop Simulator," URL, https://www.gamespark.jp/article/2014/04/15/47858.html, 5 pages, (Apr. 15, 2014) (for relevancy see Notification of Reasons for Refusal for corresponding JP Application No. 2018-223828 cited above).
Xion Kisaragi, Play PSP Version Summon Night 3 at Your Own Pace ACT6-3, YouTube [online] [video], URL, https://www.youtube.com/watch?v=d_Lj7aQZOPE, 3 pages, (Oct. 21, 2012) (For relevancy see Notification of Reasons for Refusal for corresponding JP Application No. 2018-223828 cited above).

* cited by examiner

DISPLAY CONTROL PROGRAM, DISPLAY CONTROL APPARATUS, DISPLAY CONTROL METHOD, AND RECORDING MEDIUM

BACKGROUND

The present disclosure relates to a display control technology and, more particularly, to a display control program, a display control apparatus, and a display control method that are configured to control display on a head mounted display, and a non-transitory computer-readable recording medium.

A game which is able to be played by a user wearing on his or her head a head mounted display that is connected to a game machine and operating a controller for example while looking at a screen displayed on the head mounted display has been popular. With an ordinary stationary display connected to a game machine, the user's visual field range extends also to the outside of a display screen, so that the user may not concentrate on the screen or lose the sense of immersion in the game being played. On the contrary, wearing a head mounted display provides effects of the increased sense of immersion in the video world and enhanced game entertainment.

SUMMARY

In causing a head mounted display to display a virtual three-dimensional space, a position farther from a viewpoint position is lower in visibility than a position nearer to the viewpoint position. The present disclosure was made in consideration of this phenomenon. Therefore, it is desirable to provide a technique of enhancing the visibility of an image that is displayed on a head mounted display.

In carrying out the disclosure and according to one mode thereof, there is provided a display control program for a computer, including: by an image generation block, setting a viewpoint position and a sightline direction in accordance with one of a position and an attitude of a head mounted display worn on the head of a user head and rendering an object arranged in a virtual three-dimensional space so as to generate an image to be displayed on the head mounted display; and by a rotation control block, upon acquiring an instruction for rotating a game field arranged in the virtual three-dimensional space, rotating the game field around an axis perpendicular to the game field.

According to another mode thereof, there is provided a display control apparatus including: an image generation block configured to set a viewpoint position and a sightline direction in accordance with one of a position and a direction of a head mounted display worn on the head of a user head and render an object arranged in a virtual three-dimensional space so as to generate an image to be displayed on the head mounted display; and a rotation control block configured, upon acquiring an instruction for rotating a game field arranged in the virtual three-dimensional space, to rotate the game field around an axis perpendicular to the game field.

According to a further mode thereof, there is provided a display control method for a computer, including: setting a viewpoint position and a sightline direction in accordance with one of a position and a direction of a head mounted display worn on the head of a user head and rendering an object arranged in a virtual three-dimensional space so as to generate an image to be displayed on the head mounted display; and rotating, upon acquiring an instruction for rotating a game field arranged in the virtual three-dimensional space, the game field around an axis perpendicular to the game field.

According to a still further mode thereof, there is provided a non-transitory computer-readable recording medium recording a program, the program including: by an image generation block, setting a viewpoint position and a sightline direction in accordance with one of a position and an attitude of a head mounted display worn on the head of a user head and rendering an object arranged in a virtual three-dimensional space so as to generate an image to be displayed on the head mounted display; and by a rotation control block, upon acquiring an instruction for rotating a game field arranged in the virtual three-dimensional space, rotating the game field around an axis perpendicular to the game field.

According to the present disclosure, a technique of enhancing the visibility of an image that is displayed on a head mounted display is provided.

DETAILED DESCRIPTION OF THE PREFERRED EMBODIMENTS

In present embodiments, the following describes a display technology based on a head mounted display (HMD). A head mounted display is a display apparatus that is mounted on the head of a user such that the eyes of the user are covered, thereby allowing the user to view still images and moving images displayed on a display screen arranged in front of the user's eyes. The subjects to be displayed on the head mounted display may be such content as movies or television programs; in the present embodiment, an example is described in which a head mounted display is used as a display apparatus that displays game images.

A game apparatus practiced according to the present embodiment is one example of a display control apparatus of the present disclosure. The game apparatus generates a game image including a game field and displays the generated game image on a head mounted display by arranging the game field on a table arranged in a virtual three-dimensional space, setting a viewpoint position above the game field, and rendering the virtual three-dimensional space. This setup allows a user to continue playing a game while understanding the situations of the game field by looking over the game field. With the game field arranged on the table, it is easier for the user to visually recognize a situation on the front side near the viewpoint position of the user, but it is difficult for the user to visually recognize a situation on the depth side far from the viewpoint position of the user. Therefore, in the present embodiment, a function is provided to the user that rotates a table on which a game field is arranged around the perpendicular axis. Consequently, if the user wants to attentively view the situation on the game field on the depth side, the user is able to move the position of attention to the front side near the viewpoint position of the user by rotating the table, so that the user is able to easily visually recognize the entire game field by rotating the game field depending on the situation. As a result, the convenience of the user is enhanced.

Figure 1:
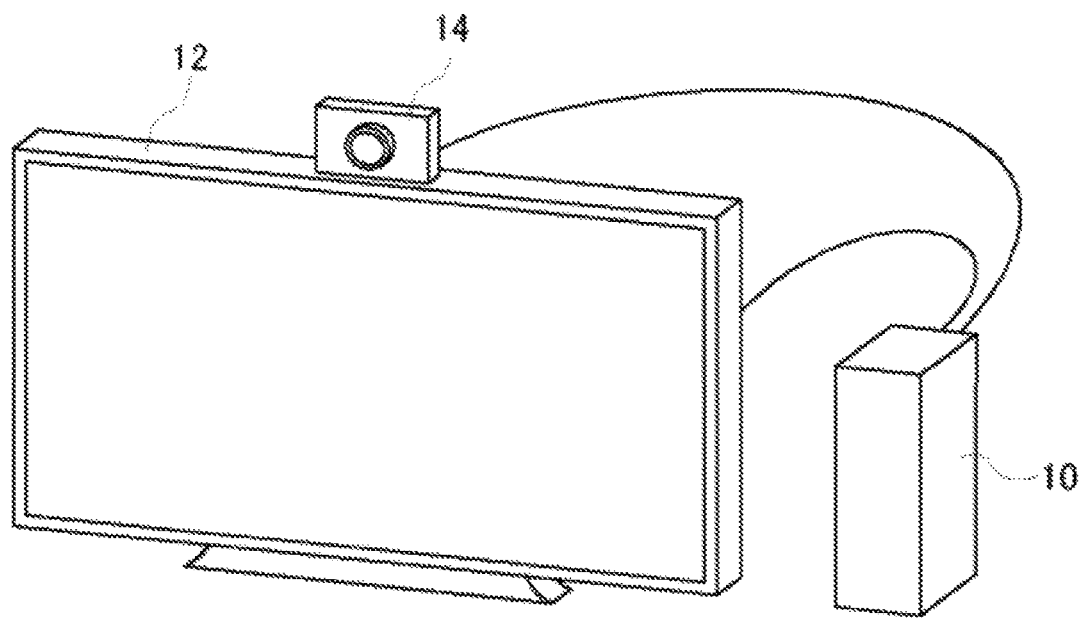
FIG. 1 is a perspective views illustrating a usage environment of a game system practiced as one embodiment of the present disclosure.
Figure 1:
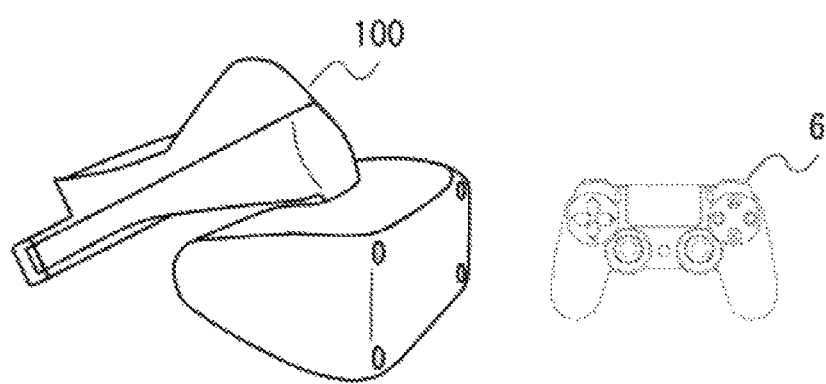

Now, referring to FIG. 1, there is shown an environment in which a game system 1 practiced as one embodiment of the present disclosure is used. The game system 1 includes a game apparatus 10 for executing a game program, an input apparatus 6 through which user instructions are entered in the game apparatus 10, an imaging apparatus 14 for taking pictures of a real space around a user, a head mounted display 100 for displaying a first game image generated by the game apparatus 10, and a display apparatus 12 for displaying a second game image generated by the game apparatus 10.

The game apparatus 10 executes a game program on the basis of instruction input entered from the input apparatus 6 or the head mounted display 100 and the position or attitude of the input apparatus 6 or the head mounted display 100, and generates a first game image to transmit the generated first game image to the head mounted display 100 and generates a second game image to transmit the generated second image to the display apparatus 12.

The head mounted display 100 displays the first game image generated in the game apparatus 10. Further, the head mounted display 100 transmits information related with a user input operation done through an input apparatus arranged on the head mounted display 100 to the game apparatus 10. The head mounted display 100 may be connected to the game apparatus 10 with a wired cable or in a wireless manner such as wireless local area network (LAN).

The display apparatus 12 displays the second game image generated in the game apparatus 10. The display apparatus 12 may be a television having a display and a speaker or a computer display.

The input apparatus 6 has a function of transmitting a user instruction input to the game apparatus 10; in the present embodiment, the input apparatus 6 is configured as a wireless controller that provides wireless communication with the game apparatus 10. The input apparatus 6 and the game apparatus 10 may establish wireless connection by use of a Bluetooth (trademark) protocol. It should be noted that the input apparatus 6 may also be a wired controller connected to the game apparatus 10 with a cable, in addition to a wireless controller.

The input apparatus 6, driven by a battery, is configured by having two or more buttons for performing instruction input operations for making a game progress. When the user operates a button of the input apparatus 6, an instruction input done by this operation is transmitted to the game apparatus 10 through wireless communication.

The imaging apparatus 14 is a video camera configured by a charge coupled device (CCD) imaging device or a complementary metal-oxide semiconductor (CMOS) imaging device for example and takes pictures of a real space with a predetermined period, thereby generating a frame image for each period. The imaging apparatus 14 is connected to the game apparatus 10 through an interface such as universal serial bus (USB) or the like. In image captured by the imaging apparatus 14 is used to derive the positions and attitudes of the input apparatus 6 and the head mounted display 100 in the game apparatus 10. The imaging apparatus 14 may be a ranging camera for obtaining distance or a stereo camera. In this case, the imaging apparatus 14 allows the acquisition of distances between the imaging apparatus 14 and the input apparatus 6 or the head mounted display 100 for example.

In the game system 1 of the present embodiment, the input apparatus 6 and the head mounted display 100 each have a light emission block that emits a light of two or more colors. During a game, the light emission block emits light in color indicated by the game apparatus 10 which is imaged by the imaging apparatus 14. The imaging apparatus 14 takes a picture of the input apparatus 6 and generates a frame image, supplying the generated frame image to the game apparatus 10. Acquiring the frame image, the game apparatus 10 derives the positional information about the light emission block in the real space from the position and size of the image of the light emission block in the frame image. The game apparatus 10 handles the positional information as a game operation instruction, thereby reflecting the game operation instruction onto such processing of the game as controlling the operation of a player's character.

In addition, the input apparatus 6 and the head mounted display 100 each has an acceleration sensor and a gyro sensor. The sensor detection values are transmitted to the game apparatus 10 with a predetermined period. Receiving the sensor detection values, the game apparatus 10 acquires the attitude information of the input apparatus 6 and the head mounted display 100 in the real space. The game apparatus 10 handles the attitude information as an operation instruction for a game and reflects the attitude information onto the processing of the game.

It should be noted that, if a game is executed only by a user who wears the head mounted display 100, the display apparatus 12 may not be provided and the second game image to be displayed on the display apparatus 12 may not be generated. Further, if the positional information of the input apparatus 6 and the head mounted display 100 is measured by acceleration sensors built in the input apparatus 6 and the head mounted display 100, then the imaging apparatus 14 may not be provided.

Figure 2:
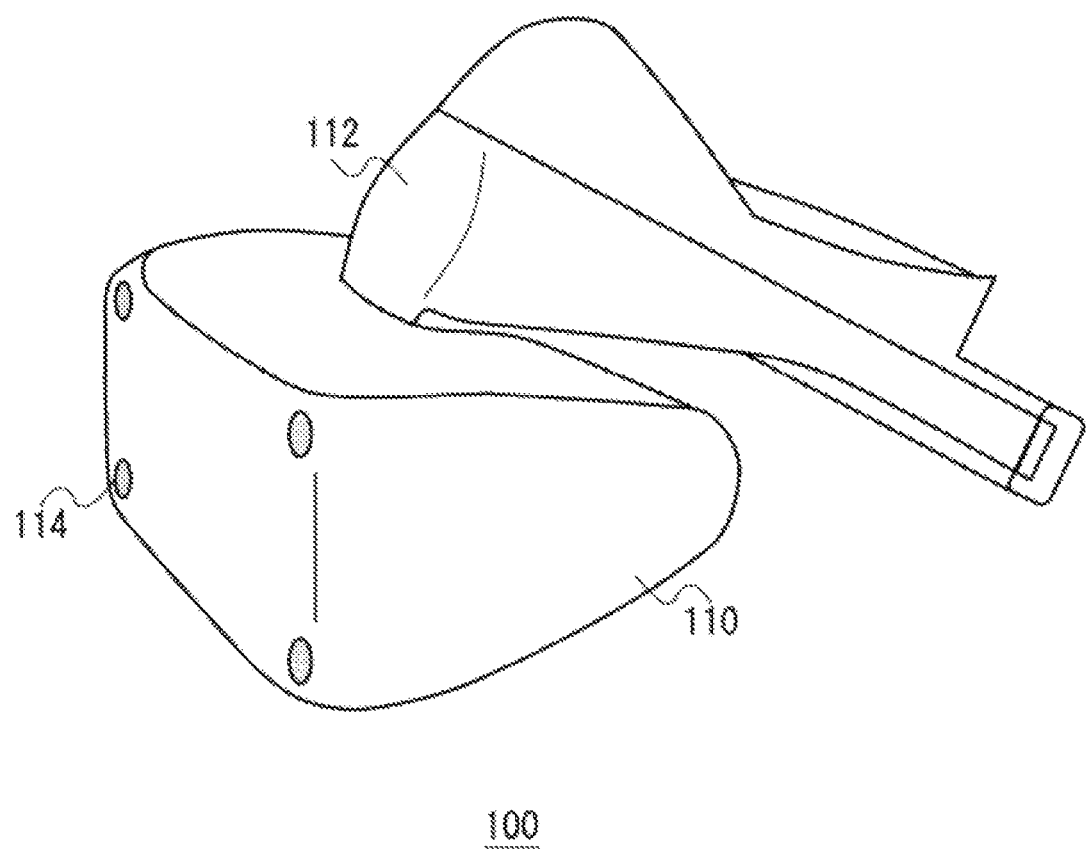
FIG. 2 is an external perspective view illustrating a head mounted display practiced as one embodiment of the present disclosure.

Referring to FIG. 2, there is shown an external view of the head mounted display 100 practiced as one embodiment of the present disclosure. The head mounted display 100 has a main body section 110, a head contact section 112, and a light emission section 114.

Arranged on the main body section 110 are a display, a global positioning system (GPS) unit for acquiring positional information, an attitude sensor, and a communication apparatus. The head contact section 112 may include a biometric information acquisition sensor for detecting biometric information such as user's body temperature, heartbeat, blood composition, perspiration, brainwave, and brain blood flow. The light emission selection 114 emits light in a color indicated by the game apparatus 10 as described above and functions as the standard for computing the position of the head mounted display 100 in an image taken by the imaging apparatus 14.

The head mounted display 100 may further include a camera for taking pictures of user's eyes. The camera arranged on the head mounted display 100 allows detection of field of view, pupil movement, and blink of the eyes of the user.

In the present embodiment, the head mounted display 100 is described; however, the display control technology of the present embodiment is also applicable not only to the head mounted display 100 in a limited sense but also a head mounted display having eye glasses, a spectacle-type display, a spectacle-type camera, a headphone, a headset (a headphone with a microphone), an earphone, an earring, an ear-hooked camera, a hat, a hat with camera, or a hair band, for example.

Figure 3:
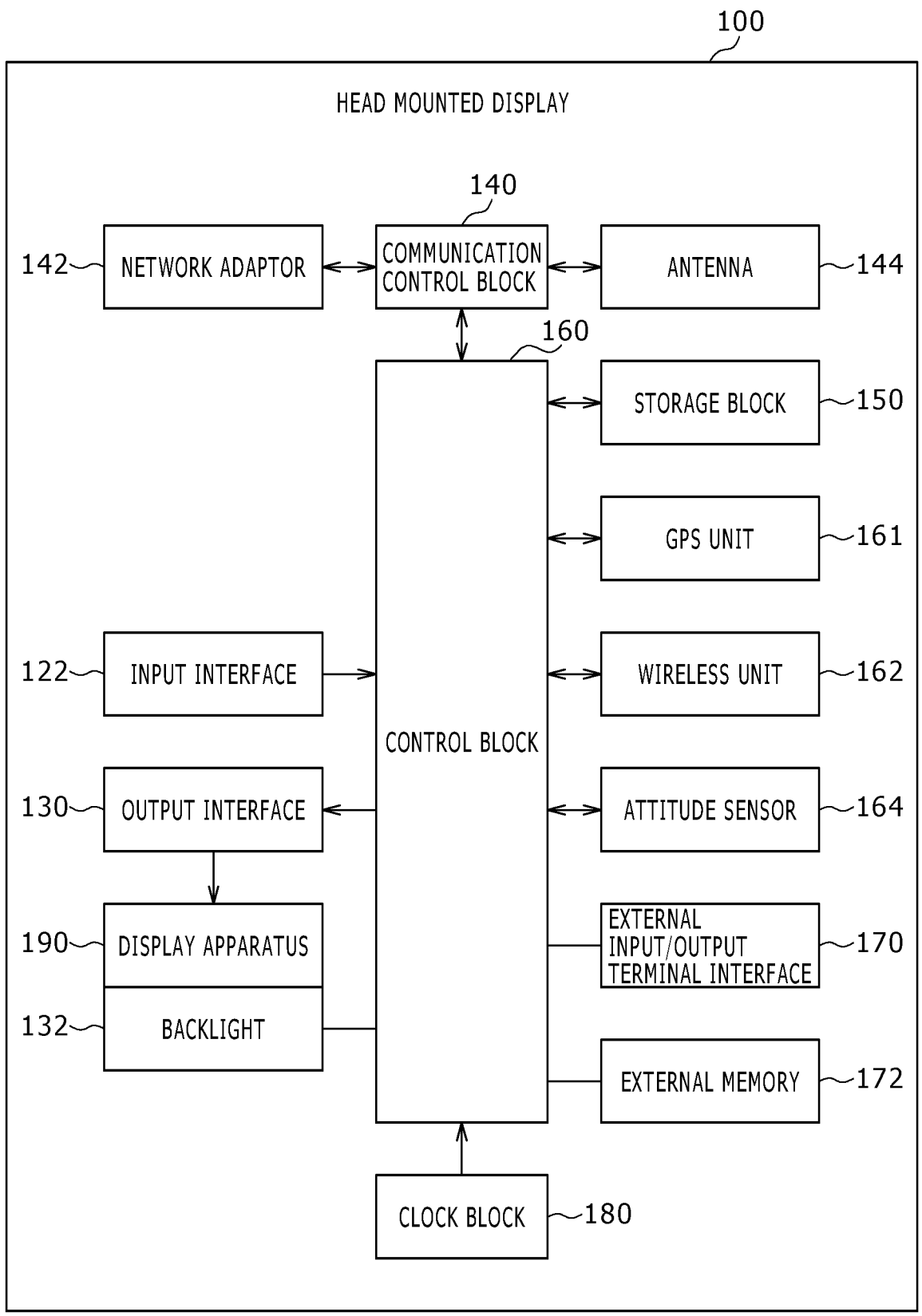
FIG. 3 is a functional configuration diagram illustrating the head mounted display.

Referring to FIG. 3, there is shown a functional diagram of the head mounted display 100. The head mounted display 100 has an input interface 122, an output interface 130, a backlight 132, a communication control block 140, a network adaptor 142, an antenna 144, a storage block 150, a GPS unit 161, a wireless unit 162, an attitude sensor 164, an external input/output terminal interface 170, an external memory 172, a clock block 180, a display apparatus 190, and a control block 160. These functional blocks are also realized by only hardware, only software, or a combination thereof.

The control block 160 is a main processor that processes signals such as an image signal and a sensor signal, instructions, and data and outputs the results of the processing. The input interface 122 receives an operation signal and a setting signal from an input button or the like and supplies the received signals to the control block 160. The output interface 130 receives an image signal from the control block 160 and makes the display apparatus 190 display the received image signal. The backlight 132 supplies backlight to a liquid crystal display that makes up the display apparatus 190.

The communication control block 140 transmits data entered from the control block 160 to the outside in a wired or wireless manner through the network adaptor 142 or the antenna 144. Also, the communication control block 140 receives data from the outside in a wired or wireless manner through the network adaptor 142 or the antenna 144 and outputs the received data to the control block 160.

The storage block 150 temporarily stores data, parameters, and operation signals that are processed by the control block 160.

The GPS unit 161 receives positional information from a GPS satellite by following an operation signal from the control block 160 and supplies the received positional information to the control block 160. The wireless unit 162 receives positional information from a wireless base station by following an operation signal from the control block 160 and supplies the received positional information to the control block 160.

The attitude sensor 164 detects attitude information such as the direction and tilt of the main body section 110 of the head mounted display 100. The attitude sensor 164 can be realized by appropriately combining a gyro sensor, an acceleration sensor, and an angular acceleration sensor.

The external input/output terminal interface 170 is an interface for the connection of peripheral devices such as a USB controller. The external memory 172 is an external memory such as a flash memory.

The clock block 180 sets time information on the basis of a setting signal received from the control block 160 and supplies time data to the control block 160.

Figure 4A:
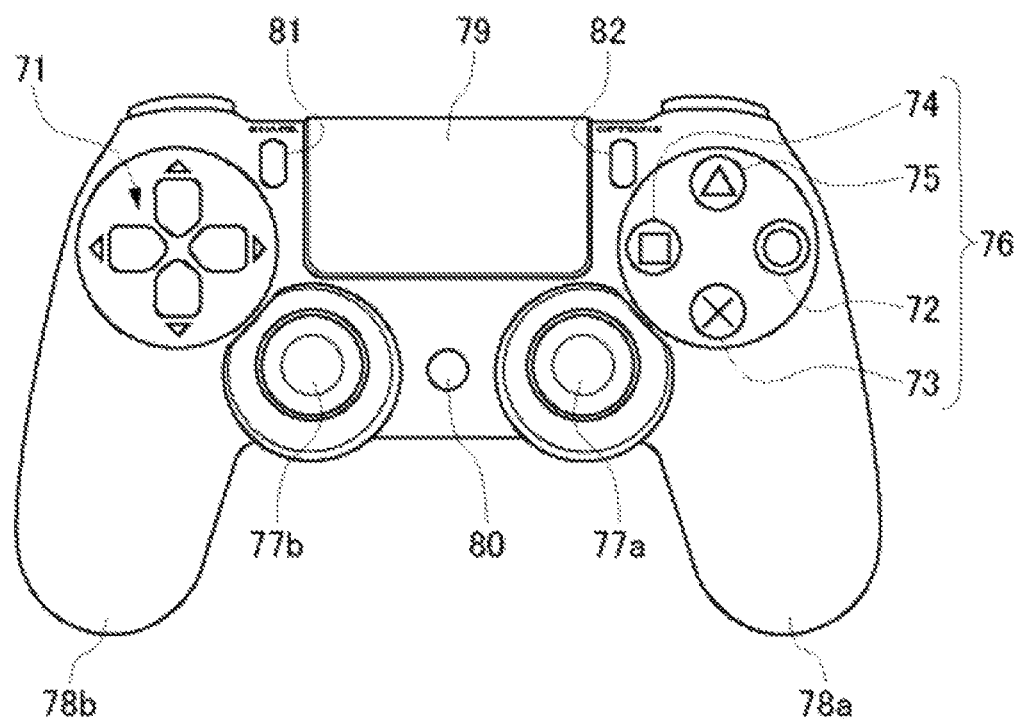
FIGS. 4A and 4B are diagrams illustrating external views of an input apparatus.

Referring to FIG. 4, there is shown an external view of the input apparatus 6. FIG. 4A shows an external configuration of the top view of the input apparatus 6. The user holds a left-side hold section 78*b* by the left hand and a right-side hold section 78*a* by the right hand and operates the input apparatus 6. Arranged on top of the housing of the input apparatus 6 are a direction key 71, analog sticks 77*a* and 77*b* and four-types of operation buttons 76 that make up the input block. Four-types of buttons 72 through 75 are identified by different colors and different symbols. Namely, the circle button 72 has a red circle, the cross button 73 has a blue cross, the square button 74 has a purple square, and a triangle button 75 has a green triangle. On top of the housing, a touch pad 79 is arranged on a flat area between the direction key 71 and the operation button 76. The touch pad 79 sinks when the user presses the panel and returns to the original position when the user releases the panel, thus functioning also as a press button.

A function button 80 is arranged between the two analog sticks 77*a* and 77*b*. The function button 80 is used to power on the input apparatus 6 and, at the same time, activate the communication function of interconnecting the input apparatus 6 and the game apparatus 10. After connection of the input apparatus 6 with the game apparatus 10, the function button 80 is also used to display a menu screen on the game apparatus 10.

A SHARE button 81 is arranged between the touch pad 79 and the direction key 71. The SHARE button 81 is used to enter a user instruction for an operating system (OS) or the system software of the game apparatus 10. An OPTIONS button 82 is arranged between the touch pad 79 and the operation button 76. The OPTIONS button 82 is used to enter a user instruction for an application (a game) that is executed on the game apparatus 10. The SHARE button 81 and the OPTIONS button 82 may be formed as push buttons.

Figure 4B:
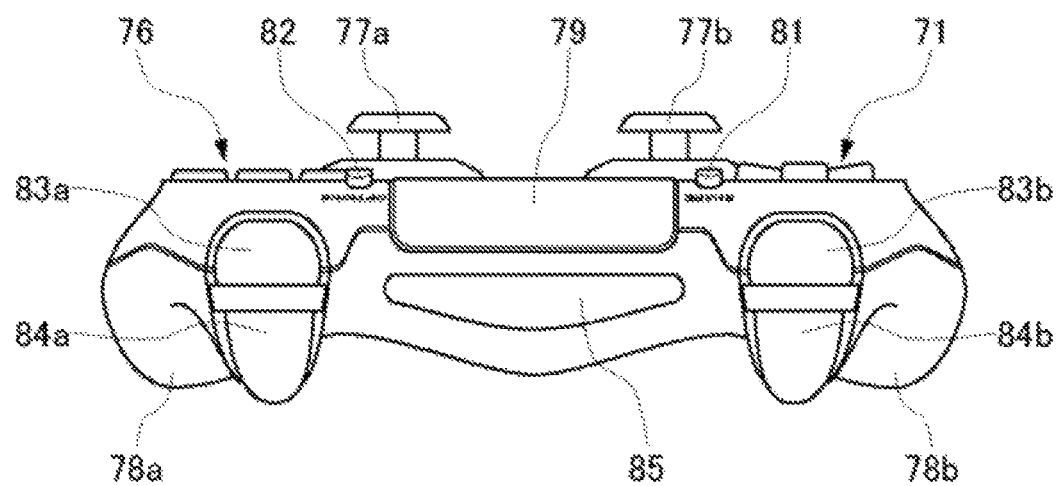

FIG. 4B shows an external configuration of a side of the rear section of the input apparatus 6. On top of the side of the rear section of the housing of the input apparatus 6, the touch pad 79 extends from the top of the housing; below the side of the rear section of the housing, a light-emitting block 85 that is long sideways is arranged. The light-emitting block 85 has red (R), green (G), and blue (B) light emitting diodes (LEDs) that are turned on according to emitted light color information transmitted from the game apparatus 10.

On the side of the rear section of the housing, an upper button 83*a* and an upper button 83*b* are arranged symmetrically along longitudinal direction, and a lower button 84*a* and a lower button 84*b* are arranged symmetrically along longitudinal direction. The upper button 83*a* and the lower button 84*a* are operated by the index finger and the middle finger of the right hand of the user, respectively; the upper button 83*b* and the lower button 84*b* are operated by the index finger and the middle finger of the left hand of the user, respectively. As shown, arranging the light-emitting block 85 between the line of the upper button 83*a* and the lower button 84*a* of the right side and the line of the upper button 83*b* and the lower button 84*b* of the left side makes the light-emitting block 85 visible without being hidden by the index finger or the middle finger that operates these buttons, thereby allowing the imaging apparatus 14 to suitably image the turned-on light-emitting block 85. The upper buttons 83a and 83b may be configured as a push button and the lower buttons 84a and 84b may be configured as a pivotally supported trigger button.

Figure 5:
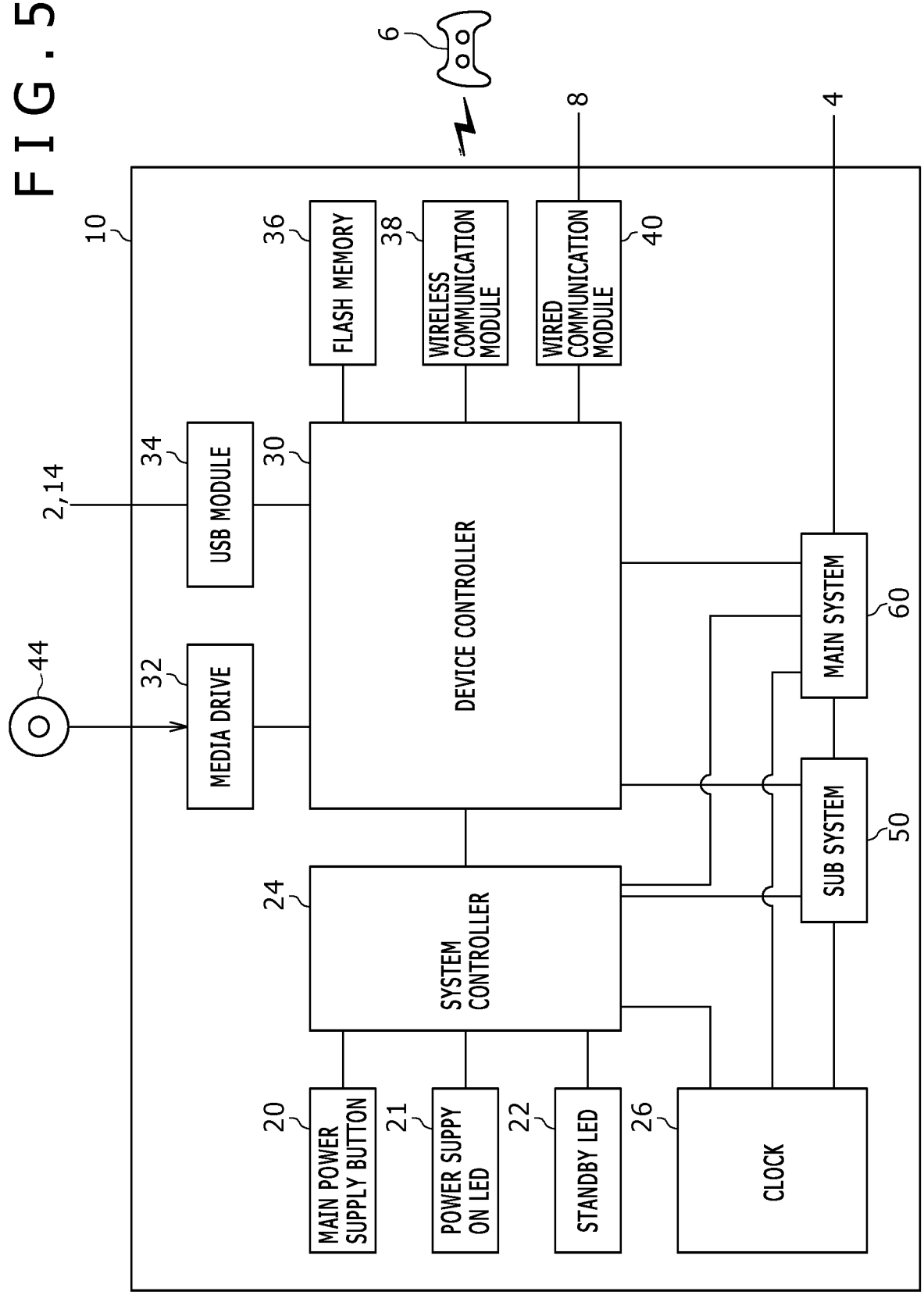
FIG. 5 is a diagram illustrating a configuration of a game apparatus.

Referring to FIG. 5, there is shown a configuration of the game apparatus 10. The game apparatus 10 has a main power supply button 20, a power supply ON LED 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 has a main central processing unit (CPU), a memory and a memory controller that form a main storage unit, and a graphics processing unit (GPU) and so forth. The GPU is mainly used for computational processing of game programs. These functions are configured as system-on-chips which may be formed on a single chip. The main CPU has a function of executing game programs recorded to an auxiliary storage apparatus 2.

The sub system 50 has a sub CPU and a memory and a memory controller that form a main storage apparatus and so forth, but does not have either a GPU or a function of executing game programs. The number of circuit gates of the sub CPU is lower than the number of circuit gates of the main CPU and the operation power dissipation of the sub CPU is lower than that of the main CPU. The sub CPU also operates while the main CPU is in a standby state and the processing function of the sub CPU is restricted to lower the power dissipation.

The main power supply button 20 that is arranged on the front side of the housing of the game apparatus 10 and is an input block through which user operation input is executed, is operated to power on/off the main system 60 of the game apparatus 10. The power supply ON LED 21 is turned on when the main power supply button 20 is turned on and the standby LED 22 is turned on when the main power supply button 20 is turned off.

The system controller 24 detects the pressing of the main power supply button 20 by the user. When the main power supply button 20 is pressed with the main power supply being off, the system controller 24 acquires this pressing operation as "on instruction," while, when the main power supply button 20 is pressed with the main power supply being on, the system controller 24 acquires this pressing operation as "off instruction."

The clock 26 is a realtime clock that generates current date and time information and supplies the generated current date and time information to the system controller 24, the sub system 50, and the main system 60.

The device controller 30 is configured as a large-scale integrated (LSI) circuit that executes transfer of information between devices like a south bridge. As shown, the device controller 30 is connected to devices such as the system controller 24, the media drive 32, the USB module 34, the flash memory 36, the wireless communication module 38, the wired communication module 40, the sub system 50, and the main system 60. The device controller 30 absorbs the difference in electric properties and data transfer speeds between the devices and controls the timing of data transfer.

The media drive 32 is a drive apparatus which is loaded with a read only memory (ROM) medium 44 recording application software such as games and license information to drive the ROM medium 44, thereby reading programs and data from the ROM medium 44. The ROM medium 44 is a read-only recording medium such as an optical disc, a magneto-optical disc, or a Blu-ray disc, for example.

The USB module 34 is a module for providing connection with external devices through a USB cable. The USB module 34 may provide connection to the auxiliary storage apparatus 2 and the imaging apparatus 14 through a USB cable. The flash memory 36 is an auxiliary storage apparatus that configures an internal storage. The wireless communication module 38 provides wireless communication with the input apparatus 6 for example on the basis of a communication protocol such as Bluetooth (trademark) protocol or the Institute of Electrical and Electronic Engineers (IEEE) 802.11 protocol. It should be noted that the wireless communication module 38 may be compliant with the third-generation digital mobile phone scheme based on the international mobile telecommunication 2000 (IMT-2000) specified by the International Telecommunication Union (ITU) or, further, may be compliant with digital mobile phone schemes of other generations. The wired communication module 40 provides wired communication with external devices, an external network via AP8 for example.

Figure 6:
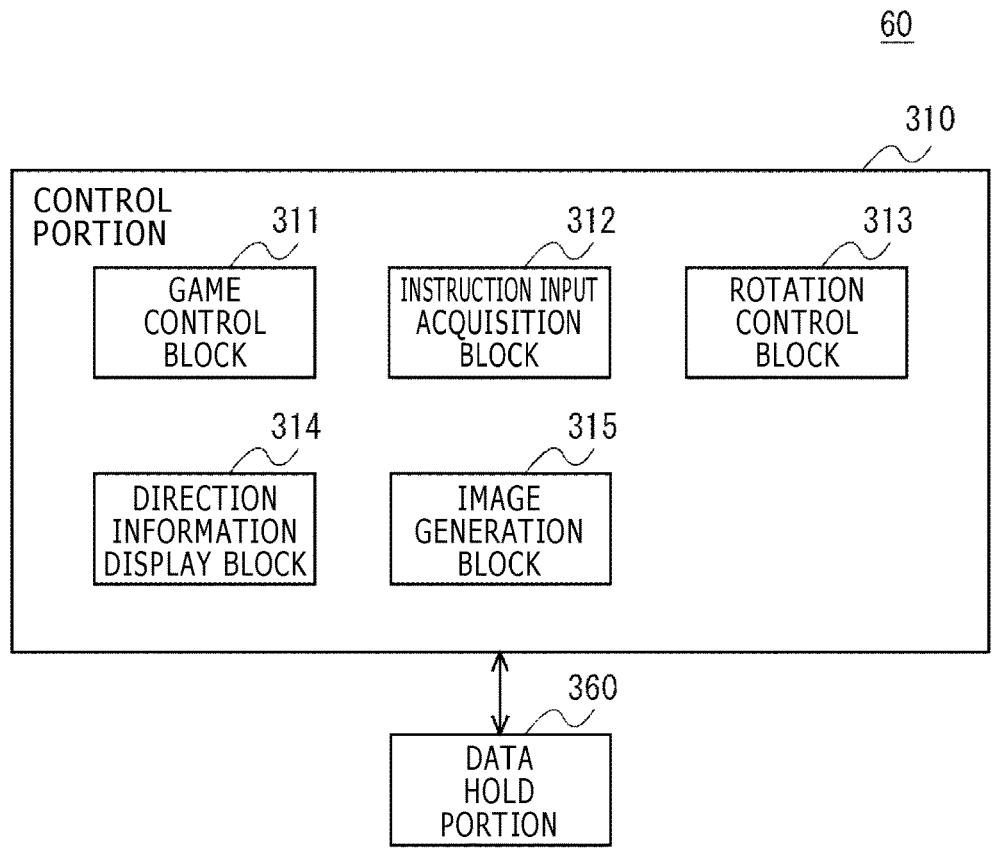
FIG. 6 is a functional configuration diagram illustrating the game apparatus.

Referring to FIG. 6, there is shown a functional configuration of the game apparatus 10. The main system 60 of the game apparatus 10 has a control portion 310 and a data hold portion 360. The control portion 310 has a game control block 311, an instruction input acquisition block 312, a rotation control block 313, a direction information display block 314, and an image generation block 315.

The data hold portion 360 holds program data of games that are executed on the game apparatus 10 and various kinds of data that are used by game programs.

The instruction input acquisition block 312 acquires, from the input apparatus 6 or the head mounted display 100, information associated with user instruction input accepted by the input apparatus 6 or the head mounted display 100. The game control block 311 executes a game program so as to make the game progress on the basis of a user's instruction input acquired by the instruction input acquisition block 312.

The image generation block 315 sets a viewpoint position and a sightline direction in accordance with the position and attitude of the head mounted display 100 and renders an object arranged in a virtual three-dimensional space, thereby generating an image to be displayed on the head mounted display 100. The image generation block 315 moves the viewpoint position in match with the position of the head mounted display 100, namely, the movement of the position of the head of the user so as to change sightline direction in match with the direction of the head mounted display 100, namely, the direction in which the head of the user is directed. This setup allows the generation of a game image that gives an effect that the user were actually inside a virtual three-dimensional space.

The rotation control block 313 acquires an instruction for rotating a game field arranged in a virtual three-dimensional space and then rotates the game field around the axis that is perpendicular to the game field. The direction information display block 314 displays, on the head mounted display 100, direction information for notifying a user of the direction in which to direct the head mounted display 100. The following describes features of these configurations with reference to game screens.

Figure 7:
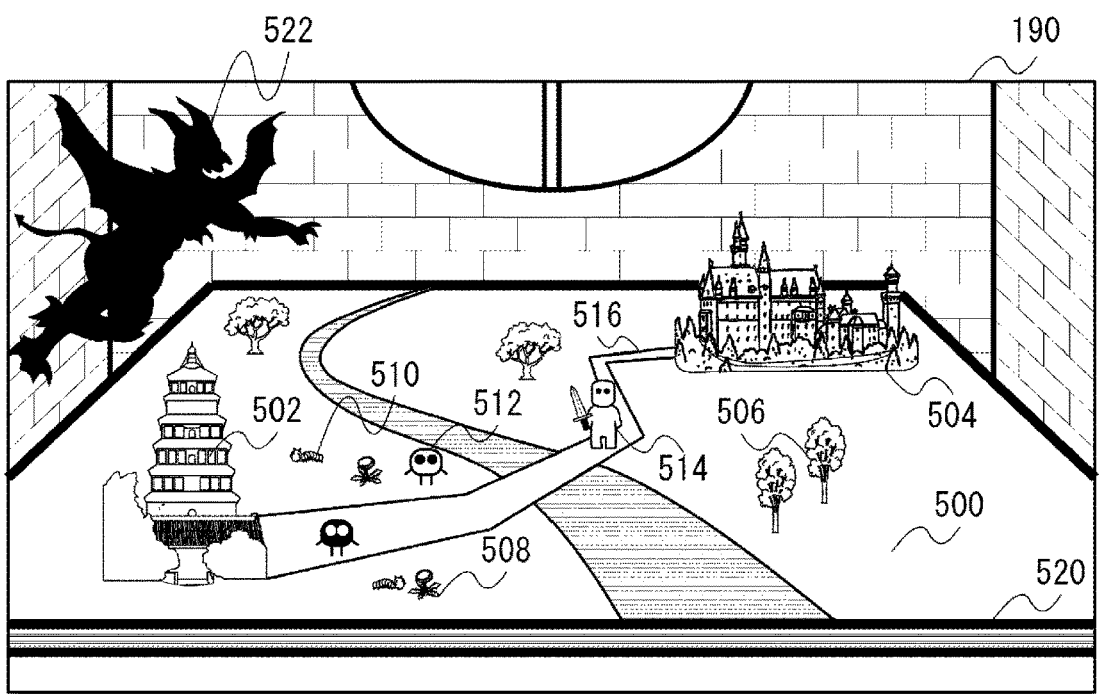
FIG. 7 is a diagram illustrating an example of a game screen that is displayed on a display apparatus of the head mounted display.

Now, referring to FIG. 7, there is shown one example of a game screen that is displayed on the display apparatus 190 of the head mounted display 100. In the game screen, an image internal to a room built as a virtual three-dimensional space is displayed. In this room, a table 520 and a Satan 522 are arranged. On top of the table 520, a game field 500 is arranged. In this game, a devil 512 is arranged in the game field 500 so as to be grown up, the devil 512 is made fight a warrior 514 invading from a castle 504 so as to block the invasion of the warrior 514, thereby protecting the Satan 522 residing in a tower 502 against the warrior 514. The room displayed in the game screen is the room of the Satan 522 on top of the tower 502. While correctly understanding the situation of the game field 500 and getting advice of the Satan 522 for example, the user plots a strategy such as the type of a devil to be arranged, the timing of the arrangement, arrangement positions, and the like, thereby arranging the devil in the game field 500. If the devil arranged in the game field 500 cannot prevent the invasion by the warrior 514, letting the warrior 514 into the tower 502, a state in which the warrior 514 invades the room to take away the Satan 522 is shown, upon which the game is over. If the devil can prevent the invasion by the warrior 514 within a predetermined period of time or within the predetermined number of times, the game is cleared.

The game control block 311 has a function of a movement control block for controlling the movement of the warrior 514 that is one example of a first object movable in the game field 500, thereby making the warrior 514 go out of the castle 504 with predetermined timings so as to move the warrior 514 along a road 516 to the tower 502. The game control block 311 controls the activities of the warrior 514 and a devil 510 and devil 512 arranged in the game field 500 by the user and, when the warrior 514 encounters the devil 510 or the devil 512, makes both fight each other, thereby deleting the loser from the game field 500. Also arranged in the game field 500 are a tree 506 and a flower 508 that are examples of second objects that are not controlled in movement by the game control block 311 functioning as the movement control block.

A prey-predator relationship is set to the devils that can be arranged in the game field 500; for example, the devil 510 grows up by eating the flower 508 and the devil 512 grows up by eating the devil 510. The user arranges the devils in the game field 500 by also considering the prey-predator relationship of the devils and nurtures the devils.

In a game screen that is shown at the start of a game, the direction of the game field 500 is set such that the tower 502 that is an own territory is on the front side near the viewpoint position of the user and the castle 504 that is an enemy territory is on the depth side far from the viewpoint position. If the user wants to check a situation around the castle 504, the viewpoint position is moved in accordance with the position of the head mounted display 100, so that it is necessary for the user to approach a game field on the depth side of the table 520 by moving the head forward by stretching the body or standing up and moving forward with the whole body; however, since it is difficult for the user to visually recognize the surrounding situation in the real world while wearing the head mounted display 100, it is also difficult for the user to largely move around in the real world. Therefore, in the present embodiment, a function of rotating the game field 500 is provided to the user. This setup allows the user to rotate the game field 500 such that a position to be visually recognized comes toward the user, so that the user can easily visually recognize the entirety of the game field 500 even if the user does not largely move around the real world.

Figure 8:
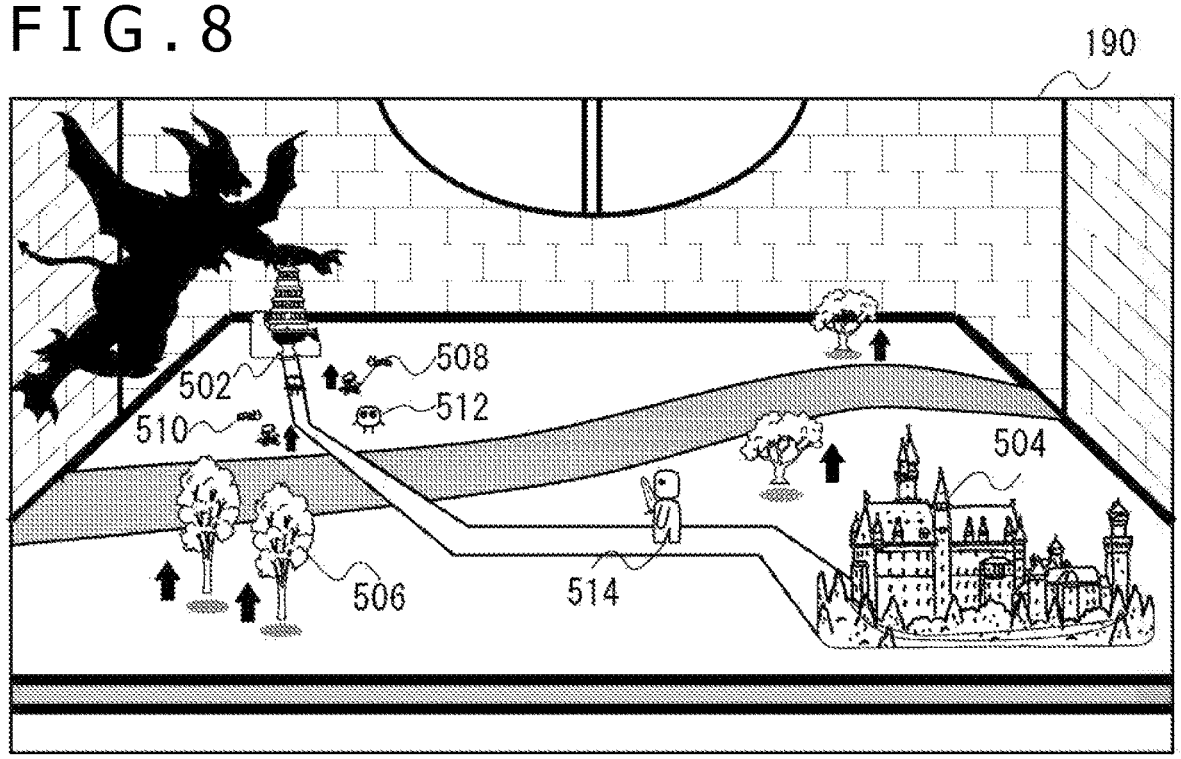
FIG. 8 is a diagram illustrating another example of a game screen that is displayed on the display apparatus of the head mounted display.

Referring to FIG. 8, there is shown another example of a game screen that is displayed on the display apparatus 190 of the head mounted display 100. The function of rotating the game field 500 is allocated to the upper buttons 83a and 83b of the input apparatus 6. When the user clicks the upper button 83a or 83b, the rotation control block 313 rotates the game field 500 by 90 degrees around the perpendicular axis that is parallel to the up down direction in the virtual three-dimensional space and passes the center of the game field 500. The game screen shown in FIG. 8 is a game screen obtained by rotating the game field 500 by 90 degrees clockwise from the game screen shown in FIG. 7.

After rotating the game field 500, among the objects arranged in the game field 500, the rotation control block 313 makes such second objects as the tree 506 and the flower 508 that are not controlled in movement by the game control block 311 jump. This setup allows the user to easily recognize the rotation of the game field 500 and, at the same time, gives a visual effect that the objects on the table 520 jump by the impact of the rotation of the game field 500. After rotating the game field 500, the rotation control block 313 does not make such first objects as the devils 510 and 512 and the warrior 514 that are controlled in movement by the game control block 311 jump. Rotation of the game field 500 changes the display positions of the devils 510 and 512 and the warrior 514; however, since the positions of these first objects are very important with respect to the characteristics of the game, prevention of the jump after the rotation of the game field 500 allows the user to easily recognize the positions of the first objects. In another example, the first objects may be highlighted after the rotation of the game field 500 by flashing display or color or size changing, for example. In still another example, the first objects may be made jump after the rotation of the game field 500 and the second objects may not be made jump. This setup also allows the user to easily recognize the positions of the first objects after the rotation of the game field 500. The tower 502 and the castle 504 may be made jump after the rotation of the game field 500 or may not be made jump. Each object may be made jump or not in accordance with the size, weight, or the degree of fixture to the game field 500 of the object concerned. The jumping may be preset for each object.

Figure 9:
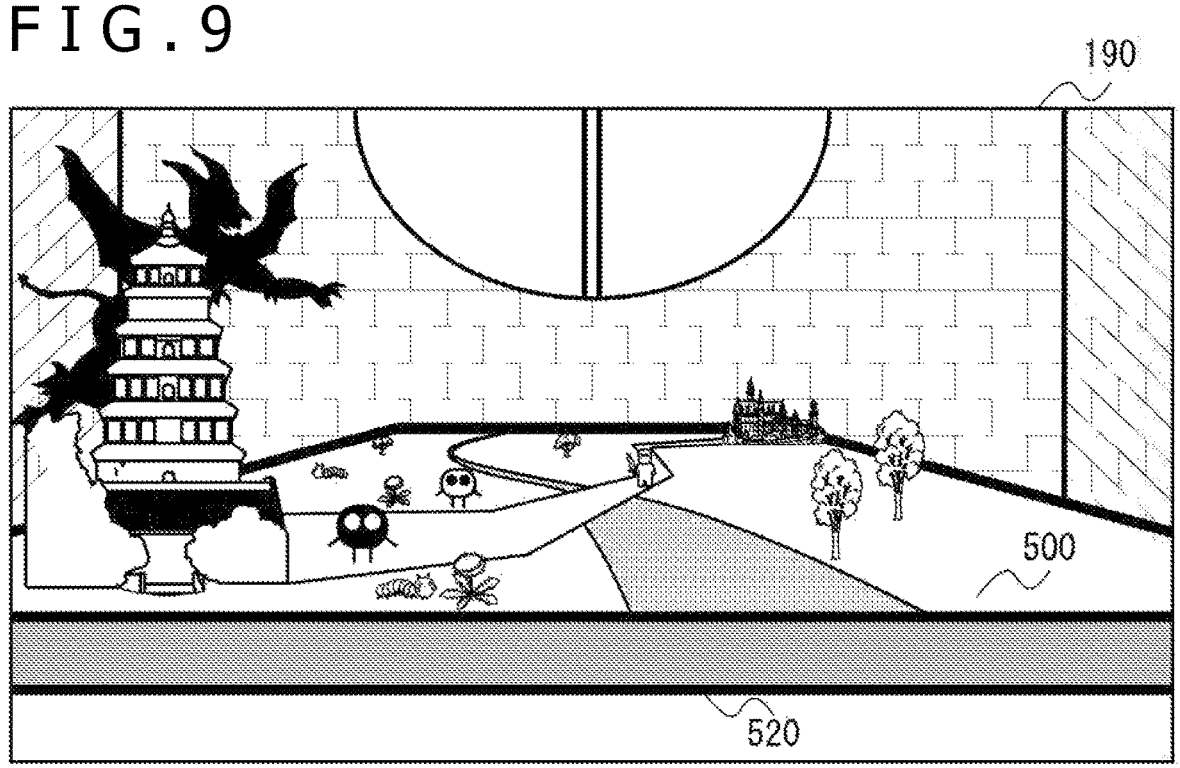
FIG. 9 is a diagram illustrating still another example of a game screen that is displayed on the display apparatus of the head mounted display.

Referring to FIG. 9, there is shown still another example of a game screen that is displayed on the display apparatus 190 of the head mounted display 100. The game screen shown in FIG. 9 is a game screen obtained when the user moves his or her head downward from the game screen shown in FIG. 7. As the head mounted display 100 moves downward, the image generation block 315 moves the viewpoint position downward. Therefore, the elevation angle between the viewpoint position in the game screen shown in FIG. 9 and the planar surface of the game field 500 is smaller than that in the game screen shown in FIG. 7. At this moment, the distance between the object toward the user in the game field 500 and the viewpoint position becomes shorter, so that rotating the game field 500 increases the moving speed of the object on the screen, thereby making it more possible to cause the user feel dizziness. Therefore, in the present embodiment, the rotation control block 313 determines a speed with which to rotate the game field 500 on the basis of an elevation angle of the viewpoint position relative to the game field 500. To be more specific, as the elevation angle of the viewpoint position relative to the game field 500 gets larger, the rotation control block 313 slows down the speed with which to rotate the game field 500. This setup allows the mitigation of the occurrence of the dizziness caused by the rotation of the game field 500.

Figure 10:
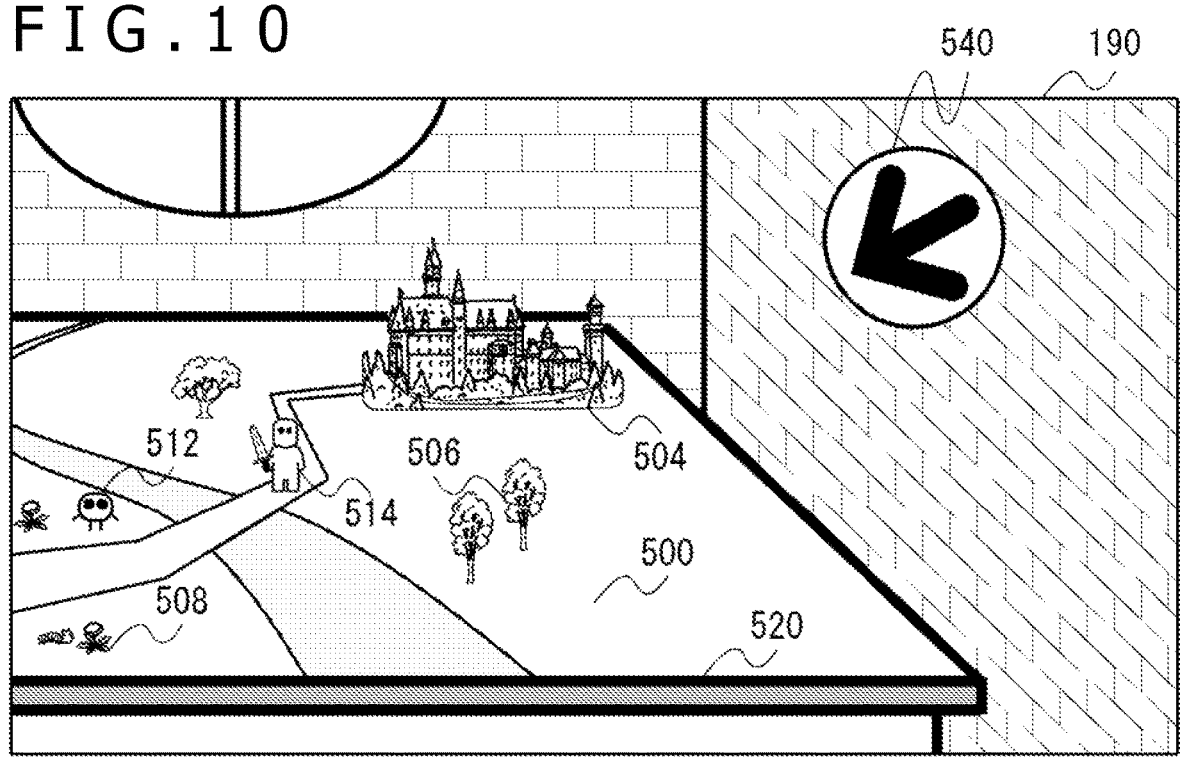
FIG. 10 is a diagram illustrating yet another example of a game screen that is displayed on the display apparatus of the head mounted display.

Referring to FIG. 10, there is shown yet another example of a game screen that is displayed on the display apparatus 190 of the head mounted display 100. The game screen shown in FIG. 10 is a game screen obtained when the user moves his or her head to the right side from the game screen shown in FIG. 7. Here assume that an event be taking place in the tower 502 in a game controlled by the game control block 311. In the game screen shown in FIG. 10, the user is directing his or her head to the right side, so that the tower 502 in which an event is taking place is positioned outside the screen, namely, is not displayed in the game screen. At this moment, in order for the tower 502 to get inside the game screen, the image generation block 315 may automatically change the sightline direction to the left side; however, if the sightline direction is changed with the user's head being standstill, dizziness may be easily caused. Therefore, in the present embodiment, in order for the user to turn the head to the left side on his or her own to look in the direction of the tower 502, the direction information display block 314 displays, on the display apparatus 190 of the head mounted display 100, an arrow mark 540 that is one example of the direction information for notifying the user of the direction in which to direct the head mounted display 100. This setup alerts the user to look in the left direction, so that the sightline direction of the user can be changed so as to display a position or an object to watch onto the game screen.

Figure 11:
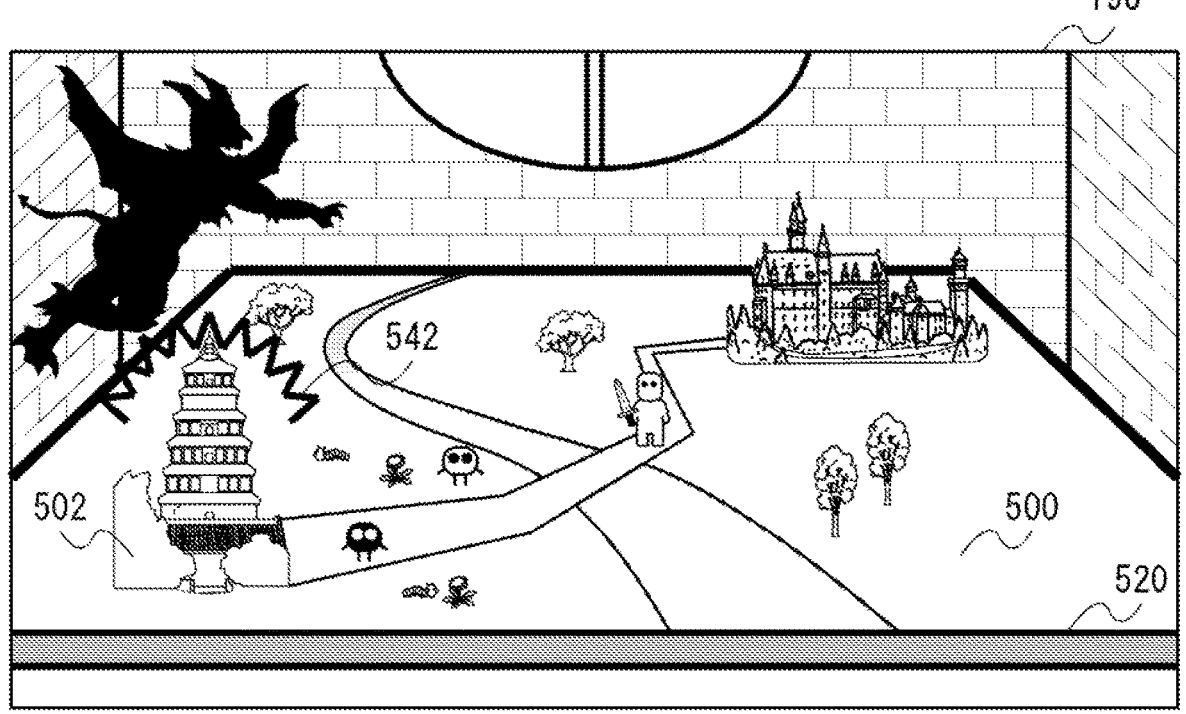
FIG. 11 is a diagram illustrating a different example of a game screen that is displayed on the display apparatus of the head mounted display.

Referring to FIG. 11, there is shown a different example of a game screen that is displayed on the display apparatus 190 of the head mounted display 100. The game screen shown in FIG. 11 is a game screen obtained when the user moves his or her head to the left side from the game screen shown in FIG. 10. When the user notices to direct the head to the left side and directs the head to the left, the tower 502 in which an event is taking place is displayed in the game screen. At this moment, in order to notify the user that the object to currently watch is the tower 502, an effect line 542 is displayed around the tower 502 so as to highlight the tower 502. Thus, if a subject to watch is not displayed in the game screen, it is necessary to display direction information for notifying the user to direct his or her head in that direction so as to display the subject to watch in the game screen; however, if a subject to watch is displayed in the game screen, the subject to watch can be clearly indicated by highlighting the subject to watch on the game screen, so that the direction information may be deleted from the game screen.

Not only in the case where, by changing the direction of the head of the user, the direction of the head mounted display 100 is changed and the sightline direction for generating a game screen is changed accordingly, resulting in the change of the visual field of the game screen, but also in the case where the game field 500 is rotated, a subject to watch located outside the range of the game screen may be displayed in the game screen. In this case too, the direction information display block 314 may display direction information in the game screen if a subject to watch is not displayed in the game screen and delete direction information from the game screen if a subject to watch is displayed in the game screen. Further, when a relative position between a subject to watch located outside the range of a game screen and the arrow mark 540 displayed in the game screen has changed by changing the direction of the head mounted display 100 or rotating the game field 500, the direction information display block 314 may change the direction of the arrow mark 540 displayed in the game screen to the direction of the subject to watch.

Figure 12:
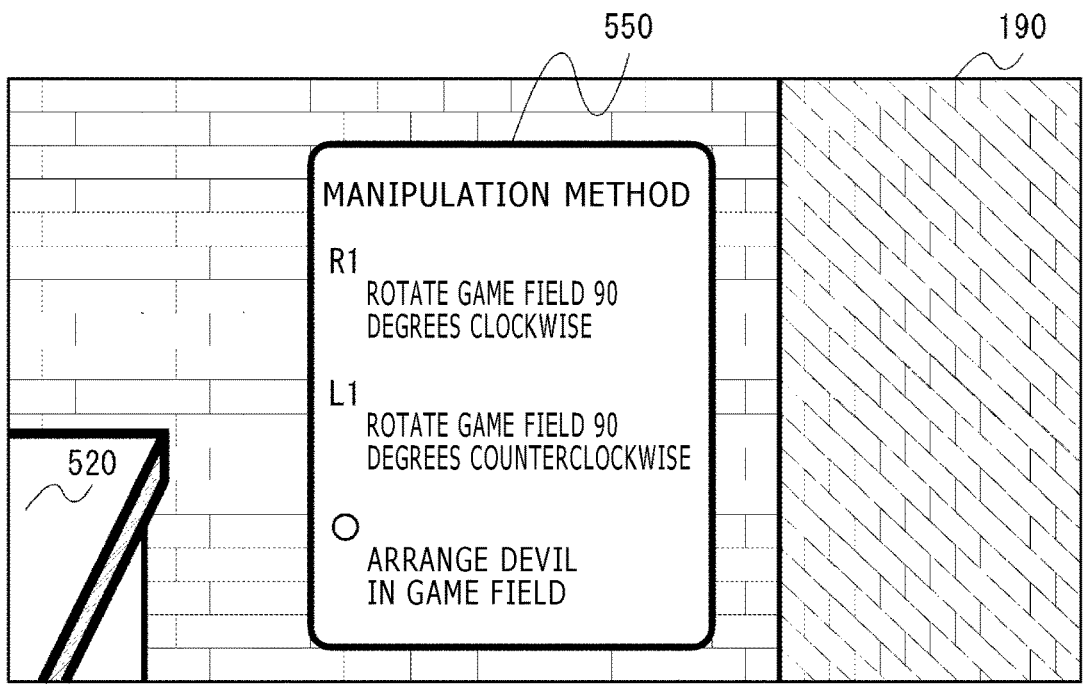
FIG. 12 is a diagram illustrating a still different example of a game screen that is displayed on the display apparatus of the head mounted display.

Referring to FIG. 12, there is shown a still different example of a game screen that is displayed on the display apparatus 190 of the head mounted display 100. The game screen shown in FIG. 12 is a game screen obtained when the user moves his or her head to the right side from the game screen shown in FIG. 7. A description 550 related with the game is written on a wall of the room not displayed in the game screen when the user is directed forward in order to look at the game field 500. Generally, when the user looks at a so-called help screen such as this, a button allocated with a function of displaying the help screen is clicked to display the help screen on the game screen in a superimposed manner or switch the game screen to the help screen. However, in the present embodiment, the help screen is arranged inside a virtual three-dimensional space, so that, without damaging a world view of the game that the user is located in the room of the Satan, the information such as the help screen can be displayed, thereby further enhancing the sense of immersion in the game.

Figure 13:
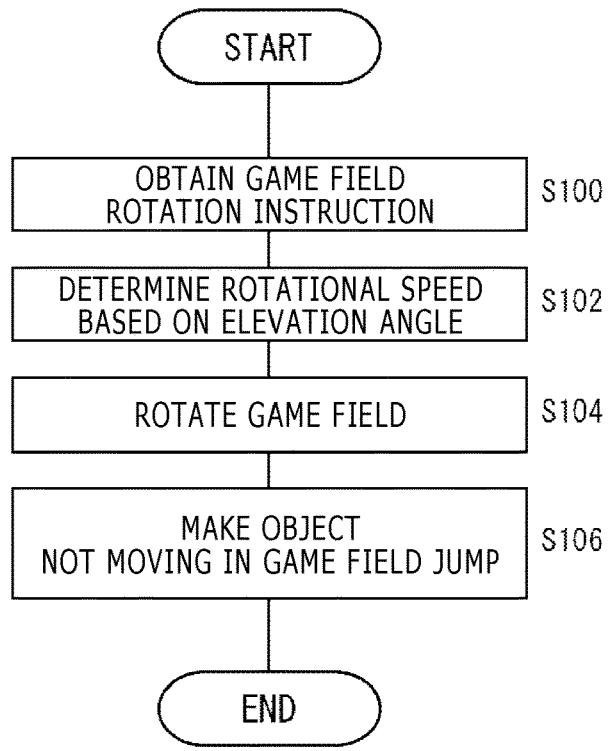
FIG. 13 is a flowchart indicative of a procedure of a game control method practiced as one embodiment of the present disclosure.

Referring to FIG. 13, there is shown a flowchart indicative of a procedure of a game control method practiced as one embodiment of the present disclosure. When a game screen that includes a game field obtained by rendering a virtual three-dimensional space is displayed on the head mounted display 100 and an instruction for rotating this game field is obtained from a user (S100), the rotation control block 313 determines a rotational speed based on an elevation angle between a viewpoint position and the game field (S102) and rotates the game field at the determined rotational speed (S104). After rotating the game field, the rotation control block 313 makes an object not controlled in movement jump, of the objects arranged in the game field (S106).

While preferred embodiments of the present disclosure have been described using specific terms, such description is for illustrative purpose only, and it is to be understood by those skilled in the art that changes and variations may be made without departing from the spirit or scope of the following claims.

In the described embodiments of the disclosure, an example in which a game field of a game of tower defense type is rotated has been explained; however, subjects of rotation may be a game field of a role playing game, a game board of a board game, or a game screen of any game. In addition, the technique described in the above-mentioned embodiments is applicable to displaying an image obtained by rendering a virtual three-dimensional space other than games onto a head mounted display.

In the described embodiments of the disclosure, an example in which a game field is rotated around the axis perpendicular thereto has been explained. The axis perpendicular to a game field may be an axis parallel to the up down direction in the game field, an axis perpendicular to a plane surface included in a game field or the plane surface constituting a game field, or, if the game field is constituted by a curved surface, an axis perpendicular to the tangent plane of the curved surface. Also, the axis perpendicular to a game field may be an axis that passes the center or gravity center of the game field or an axis that passes a given position in a game field. In another example, a subject of rotation may be rotated around a horizontal axis parallel to the left right direction in a virtual three-dimensional space. The point is that a game field may be rotated such that a position fur from a viewpoint position comes to a position near the viewpoint position. Further, a game field may be moved or deformed such that a position fur from a viewpoint position comes to a position near the viewpoint position by a method other than rotation.

The present technology contains subject matter related to that disclosed in Japanese Priority Patent Application JP 2016-175259 filed in the Japan Patent Office on Sep. 8, 2016, the entire content of which is hereby incorporated by reference.

What is claimed is:

1. A non-transitory, computer readable storage medium containing a display control program, which when executed by a computer, causes the computer to carry out actions, comprising:
   setting a viewpoint position and a sightline direction in accordance with one of a position and an attitude of a head mounted display worn on the head of a user and rendering an object arranged in a virtual three-dimensional space so as to generate an image to be displayed on the head mounted display;
   acquiring an instruction, from a hand held controller, for rotating a game field arranged in the virtual three-dimensional space; and
   rotating the game field by 90 degrees around an axis perpendicular to the game field in response to a single button click.

2. The non-transitory, computer readable storage medium according to claim 1, wherein the display control program causes the computer to further carry out actions, comprising:
   setting the viewpoint position above the game field so as to generate the image in which the game field is overlooked; and
   on the basis of an elevation angle of the viewpoint position relative to the game field, determining a speed at which to rotate the game field.

3. The non-transitory, computer readable storage medium according to claim 2, wherein as the elevation angle of the viewpoint position relative to the game field gets smaller, the speed of the rotation of the game field is slowed down.

4. The non-transitory, computer readable storage medium according to claim 1, wherein after rotating the game field, a display mode of the object arranged in the game field changes.

5. The non-transitory, computer readable storage medium according to claim 4, the display control program causes the computer to further carry out actions, comprising:
   controlling a movement of a first object that is movable in the game field among objects arranged in the game field,
   wherein in changing the display mode of the object arranged in the game field after rotating the game field, a display mode of the first object is changed to a display mode of a second object that is not controlled in movement among objects arranged in the game field.

6. The non-transitory, computer readable storage medium according to claim 1, the display control program causes the computer to further carry out actions, comprising displaying, on the head mounted display, direction information for notifying the user of a direction in which to direct the head mounted display.

7. The non-transitory, computer readable storage medium according to claim 6, wherein if the object to be displayed is not displayed in the image generated direction information is displayed for notifying the direction in which to direct the head mounted display so as to display the object to be displayed.

8. A display control apparatus comprising:
   an image generation block configured to set a viewpoint position and a sightline direction in accordance with one of a position and a direction of a head mounted display worn on the head of a user and render an object arranged in a virtual three-dimensional space so as to generate an image to be displayed on the head mounted display; and
   a rotation control block configured, upon acquiring an instruction, from a hand held controller, for rotating a game field arranged in the virtual three-dimensional space, to rotate the game field by 90 degrees around an axis perpendicular to the game field in response to a single button click.

9. A display control method for a computer, comprising:
   setting a viewpoint position and a sightline direction in accordance with one of a position and a direction of a head mounted display worn on the head of a user and rendering an object arranged in a virtual three-dimensional space so as to generate an image to be displayed on the head mounted display; and
   rotating, upon acquiring an instruction, from a hand held controller, for rotating a game field arranged in the virtual three-dimensional space, the game field by 90 degrees around an axis perpendicular to the game field in response to a single button click.

10. A non-transitory computer-readable recording medium recording a program, which when executed by a computer causes the computer to carry out actions, comprising:
   setting a viewpoint position and a sightline direction in accordance with one of a position and an attitude of a head mounted display worn on the head of a user and rendering an object arranged in a virtual three-dimensional space so as to generate an image to be displayed on the head mounted display; and
   upon acquiring an instruction, from a hand held controller, for rotating a game field arranged in the virtual three-dimensional space, rotating the game field by 90 degrees around an axis perpendicular to the game field in response to a single button click.

* * * * *